United States Patent
Binder (10) Patent No.: US 7,938,000 B2
(45) Date of Patent: May 10, 2011

(54) METHOD AND MEASURING DEVICE FOR MEASURING OVERLAP ON AN AIRCRAFT WING

(75) Inventor: Michael Binder, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 251 days.

(21) Appl. No.: 12/554,337

(22) Filed: Sep. 4, 2009

(65) Prior Publication Data

US 2010/0071455 A1    Mar. 25, 2010

Related U.S. Application Data

(60) Provisional application No. 61/194,162, filed on Sep. 25, 2008.

(51) Int. Cl.
*G01N 7/22* (2006.01)
(52) U.S. Cl. .................................................. 73/170.02
(58) Field of Classification Search .................. None
See application file for complete search history.

(56) References Cited

U.S. PATENT DOCUMENTS

| | | | | |
|---|---|---|---|---|
| 3,129,905 A | * | 4/1964 | Taylor | 244/210 |
| 3,904,152 A | * | 9/1975 | Hill | 244/214 |
| 3,921,302 A | | 11/1975 | Wilkerson | |
| 4,739,954 A | * | 4/1988 | Hamilton | 244/123.1 |
| 5,611,501 A | * | 3/1997 | Crandley | 244/1 R |
| 2004/0065783 A1 | * | 4/2004 | Robinson | 244/216 |

FOREIGN PATENT DOCUMENTS

| | | |
|---|---|---|
| GB | 2147420 A | 5/1985 |
| WO | WO 01/65201 A2 | 9/2001 |
| WO | WO 2009130026 A2 * | 10/2009 |

OTHER PUBLICATIONS

German Office Action from DE 10 2008 042 362.9 dated Jun. 19, 2009.

* cited by examiner

*Primary Examiner* — Andre J Allen
(74) *Attorney, Agent, or Firm* — Jenkins, Wilson, Taylor & Hunt, P.A.

(57) ABSTRACT

The present invention relates to a method and a measuring device for measuring and displaying the overlap between a rear edge of an aircraft wing and a front edge of a landing flap fixed thereto. In accordance with the invention, only the difference in the positions of the rear edge of the aircraft wing and the front edge of the landing flap relative to the longitudinal direction of the aircraft is determined. For this purpose, a first sensor is positioned, as a reference of sorts, at one of the two positions, for example at the rear edge of the aircraft wing, and the display is then reset to zero or to another reference value. By positioning the second sensor, which is also rigidly connected to the calliper, at the other respective position, for example at the front edge of the landing flap, the difference between the front edge of the landing flap relative to the rear edge of the aircraft wing is established. This value, which directly indicates the overlap value, can now be read directly from the display of the calliper.

17 Claims, 9 Drawing Sheets

METHOD AND MEASURING DEVICE FOR MEASURING OVERLAP ON AN AIRCRAFT WING

CROSS-REFERENCE TO RELATED APPLICATIONS

This application claims the benefit of U.S. Provisional Application No. 61/194,162, filed Sep. 25, 2008, the entire disclosure of which is herein incorporated by reference.

FIELD OF THE INVENTION

The present invention relates to a method and a measuring device for measuring overlap between a rear edge of an aircraft wing and a front edge of a landing flap fixed thereto.

When developing new aircraft models, the properties of an aircraft are first examined on smaller aircraft models, these models being placed in a wind tunnel for example and the aerodynamic properties thereof being optimised there. A major test parameter in wind tunnel testing is the aerodynamic properties of the aircraft wing, in particular in the region of the landing flap and the spoiler. The present invention and underlying problem will be explained hereinafter with reference to a wind tunnel measurement, without the invention being limited thereto however.

Figure 1:
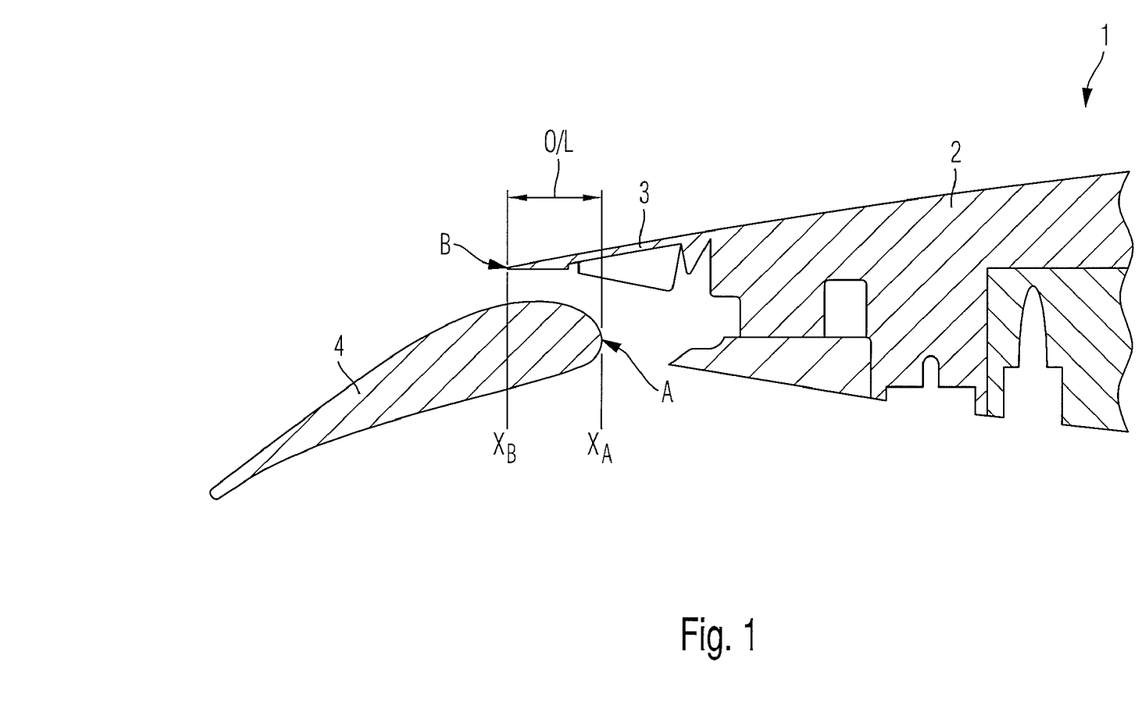
FIG. 1 is a sectional view of an aircraft wing with a spoiler and landing flap fixed thereto for the purpose of illustrating the process of measuring overlap.

FIG. 1 of the drawings shows, with reference to a sectional view, a detail of an aircraft wing denoted by reference numeral 1. The aircraft wing 1 comprises the actual wing body 2, to the rear region of which the spoiler 3 is fixed. A landing flap 4 is also fixed to the aircraft wing 1 via a fixing device (not shown). The landing flap 4 is displaceable and pivotable in the longitudinal direction of the aircraft via a rail system, what is known as a track.

A landing flap 4 is a lift-increasing device attached to the wing of an aircraft which, in specific flight situations such as during take-off and landing, increases the lift coefficient of the wings, the aircraft thus being capable of flight, even at low speeds such as during take-off or landing, owing to a higher level of lift.

A spoiler, which is often also known as a disrupter flap, consists of moveable flaps attached to the upper face of the wing. If these spoiler flaps are extended during flight, the speed of the aircraft is reduced owing to the higher level of air drag. Once the aircraft has made contact with the ground when landing, the spoilers are extended, for example fully, so as to significantly reduce the lift of the wings and simultaneously increase air drag.

When constructing new aircraft models, it is essential to determine and optimise the different positions of the landing flaps 4 relative to the spoiler 3 or the aircraft wing 1 in various flight situations. A major parameter in this case is the so-called overlapping, usually also known as overlap, of landing flaps 4 relative to the spoiler 3. In order to determine the overlap, the exact X-position $X_A$ of the front edge A of the landing flap 4 on the one hand and, on the other hand, the corresponding X-position $X_B$ of the rear edge B of the spoiler 3 must be established. The overlap O/L denotes the difference between these two X-positions $X_A$, $X_B$, i.e. O/L=$X_B$−$X_A$. The overlap may also be negative if the landing flap 4 is not actually overlapped by the spoiler 3, but instead these parts are distanced from one another in the longitudinal direction.

The two positions $X_A$ and $X_B$ are established manually and separately using a measuring device and are input into a calculation device. The overlap is then determined by subtracting the two values. These measurements and the subsequent calculation must be carried out separately for all possible overlaps and thus for all angles of incidence and positions of the landing flap 4 and for all positions of the spoiler 3 and for each aircraft wing 1 in the transverse direction at various positions. This is extremely time-consuming and therefore expensive. In particular, in the case of wind tunnel measurements for determining an optimal construction of the aircraft wing, the time factor is considerable, in particular for cost reasons. In this respect, there is always the need to reduce the amount of necessary time involved to a minimum during wind tunnel tests of this type for determining optimal construction.

SUMMARY OF THE INVENTION

The object of the present invention is to be able to measure the overlap, in particular in wind tunnel tests, in a simpler and more reliable manner.

This object is achieved in accordance with the invention by a method having the features of claim 1 and/or by a measuring device having the features of claim 11.

The underlying idea of the present invention lies in that the two values for determining overlap, i.e. the exact positions of the rear edge of the landing flap and of the corresponding front edge of the spoiler or aircraft wing, do not necessarily have to be established separately from one another. The overlap thus denotes the difference between the X-position of the rear edge of the aircraft wing and the X-position of the front edge of the landing flap relative to the longitudinal axis of the aircraft. The idea of the present invention consists of providing a method and a tool, by means of which it is possible to directly measure, and above all directly display, the overlap. The entire measurement is thus carried out extremely quickly and reliably.

For this purpose, a measuring device devised specifically therefor is provided and is fixed to the aircraft wings. In accordance with the invention, the individual positions, i.e. the exact position of the rear edge of the aircraft wing and the exact position of the front edge of the landing flap, are not determined, but only the difference therebetween relative to the longitudinal direction of the aircraft is determined. For this purpose, a sensor is positioned, as a reference of sorts, at one of the two positions, for example at the rear edge of the aircraft wing, and the display is then reset to zero or to another reference value. By positioning the second sensor, which is also rigidly connected to the calliper, at the respective other position, for example at the front edge of the landing flap, the direct difference between the front edge of the landing flap relative to the rear edge of the aircraft wing is thus established and displayed by way of the display of the calliper. This value, which directly indicates the overlap value, can now be read directly from the display of the calliper.

Advantageously, no complex tables and lists are necessary to establish the overlap using this method. Variations in the construction of an aircraft wing may thus be carried out in a much simpler and more spontaneous manner than was previously possible. Mistakes which may occur when converting values to establish the overlap, for example owing to an incorrect subtraction, are in this case avoided in a simple yet extremely effective manner.

Owing to the extremely quick and simple construction of the measuring device for determining overlap, the measuring method according to the invention is also extremely quick and, as a result, extremely cost-effective, in particular when used in a wind tunnel.

Advantageous embodiments and developments of the invention will become clear from the sub-claims as well as from the description, when considered together with the figures of the drawings.

Previously, overlap measurements were carried out at the lower face of the aircraft wing. In a preferred embodiment, the calliper is now fixed directly on the aircraft wing on the upper face in such a way that the overlap measurement is now carried out from the upper face of the aircraft wing. It is particularly preferred to measure overlap at defined points of the aircraft wing. In particular, the rails provided on the lower face of an aircraft wing, which are known as the track stations, are particularly suitable as reference positions, above which the landing flaps are longitudinally displaced. An overlap measurement at these track stations is, however, understandably difficult at the lower face, since these track stations make it difficult to attach the calliper. The calliper is now preferably fixed on the upper face of the aircraft wing in the region of these track stations, so as to thus carry out the overlap measurement at these precisely defined positions.

The calliper is fixed to the aircraft wing in such a way that the first and second sensors fixed to the calliper are displaceable, above all in the direction of the longitudinal axis, i.e. the X-direction, of the aircraft. It is also particularly advantageous if these sensors are also displaceable in the vertical axis, i.e. the Z-direction, of the aircraft, since the landing flap is also typically displaceable in the vertical axis relative to the aircraft wing. The overlap can thus be established in various positions of the landing flap relative to the aircraft wing.

In order to establish the overlap, the distance between the landing flap and the spoiler of an aircraft wing is typically established relative to the longitudinal direction. In many cases, in which the aircraft wing is fitted with a spoiler, the rear edge of the aircraft wing is formed by the rear edge of the spoiler fixed thereto. Of course, it is also possible, in particular for aircraft wings without a spoiler of this type, to examine the rear edge of the wing body of an aircraft wing in order to establish the overlap.

In a typical embodiment, the second sensor is pivoted out of the measuring region before the first sensor is positioned. When positioning the first sensor and thus when measuring the position of the rear edge of the aircraft wing or the spoiler fixed thereto, the second sensor is thus prevented from influencing, distorting or even impeding this measurement. Similarly, the first sensor is typically pivoted out of the measuring region and the second sensor is pivoted back into the measuring region before the second sensor is positioned. The position of the front edge of the landing flap can thus be measured in a similar manner by the second sensor with no interference from the first sensor.

In a preferred embodiment, a first and/or second engagement device is associated with the first and/or second sensor. This first and/or second engagement device can define when the first sensor abuts the rear edge of the aircraft wing or when the second sensor abuts the front edge of the landing flap. These measuring positions are thus achieved when the first and/or second sensor is engaged with the first and/or second engagement device associated therewith. An extremely precise measurement and thus positioning is thus ensured, which enables even more precise overlap measurements.

In addition, third and fourth engagement devices may also be provided which indicate when the first and/or second sensor is arranged in the respective measuring position provided for the measurement. A correct measurement is thus achieved, since it is always ensured that in the engaged state the sensors are arranged precisely at the measuring position assigned thereto and therefore do not deviate even slightly from this measuring position. This also reduces measurement errors when establishing overlap, which errors may result from an inaccurate measurement set-up.

In a particularly preferred embodiment, the overlap is measured and established during a wind tunnel test. In said wind tunnel test an aircraft which has already been developed, a prototype thereof or preferably a model of an aircraft of this type which is to be developed is arranged in the wind tunnel. Since wind tunnel tests of this type are typically relatively expensive, the method according to the invention is suitable since it enables extremely simple and quick measurements, and thus cheaper wind tunnel tests, to be carried out.

In a preferred embodiment, the second sensor is configured as a double L-shaped angled measuring wire which can be rotated or pivoted laterally. By way of this extremely simple construction of the second sensor, it is possible to establish the positions of two laterally distanced, opposing positions in the X-direction of the landing flap and spoiler by way of a single measuring device comprising two sensors. These sensors thus sense the two X-positions in and against the longitudinal direction of the aircraft.

The calliper is preferably configured as a simple vernier calliper. This vernier calliper may be configured in an analogue or digital manner. It is particularly preferred for the vernier calliper and thus the calliper to be configured digitally and to thus comprise a digital display means which displays the measured values in digital form, for example by way of an LCD display. The overlap can thus be read directly from the digital display once the first measured value has been established, for example by the first sensor, and a subsequent resetting, for example to zero, has been carried out when measuring the second value by way of the second sensor. Mistakes which may occur during analysis and calculation are prevented in this case. The digital display also allows, above all, the display to be reset in an extremely simple manner to zero or to a predetermined value.

The above embodiments and developments of the invention may be combined in any suitable manner.

BRIEF DESCRIPTION OF THE DRAWINGS

The present invention will be described in greater detail hereinafter with reference to the embodiments given in the schematic figures of the drawings, in which.

DETAILED DESCRIPTION OF THE DRAWINGS

Like and functionally similar elements and features in the figures of the drawings are denoted with like reference numerals, unless otherwise indicated.

Figure 2:
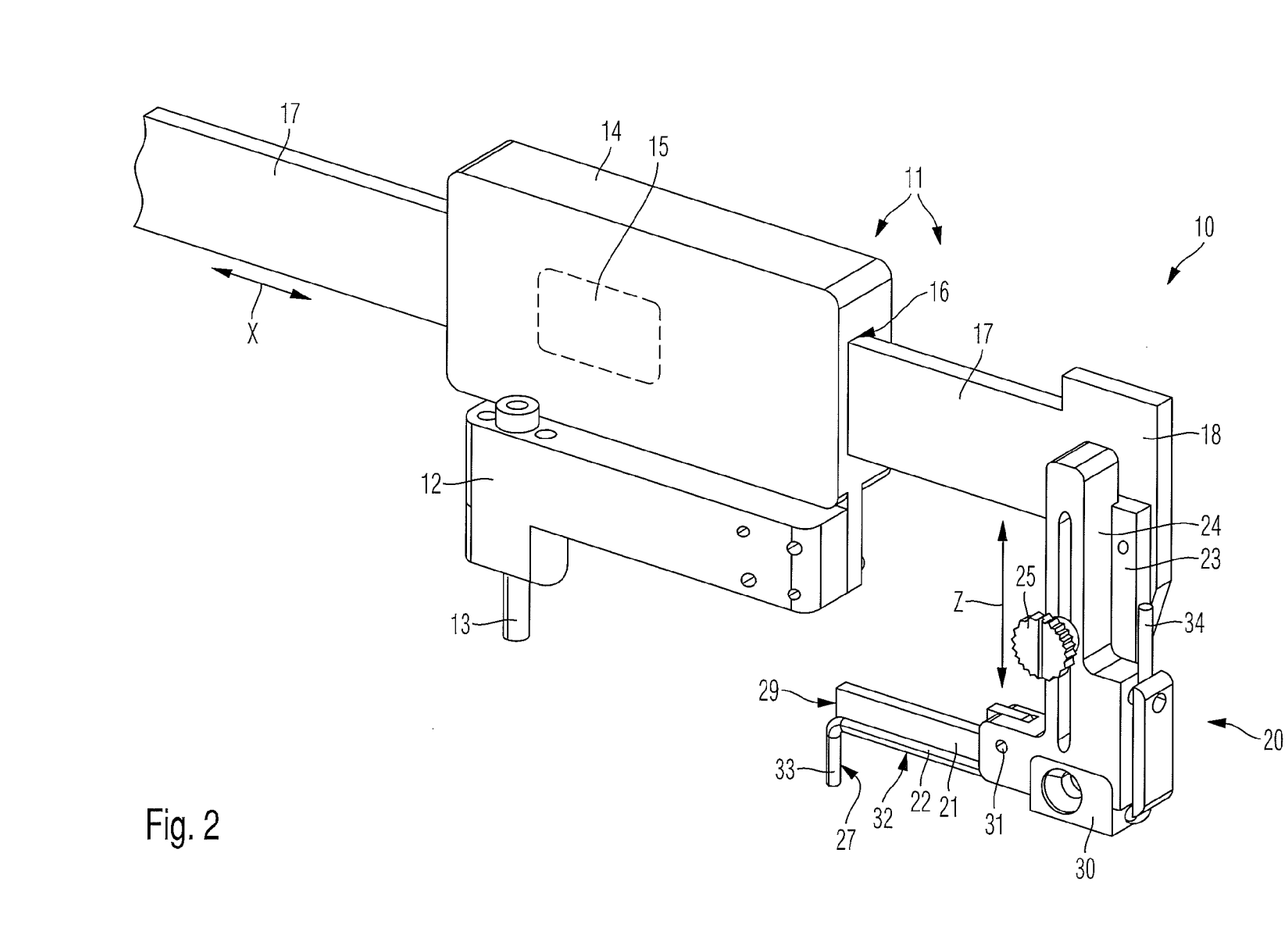
FIG. 2 is a perspective view of the measuring device according to the invention.
Figure 2A:
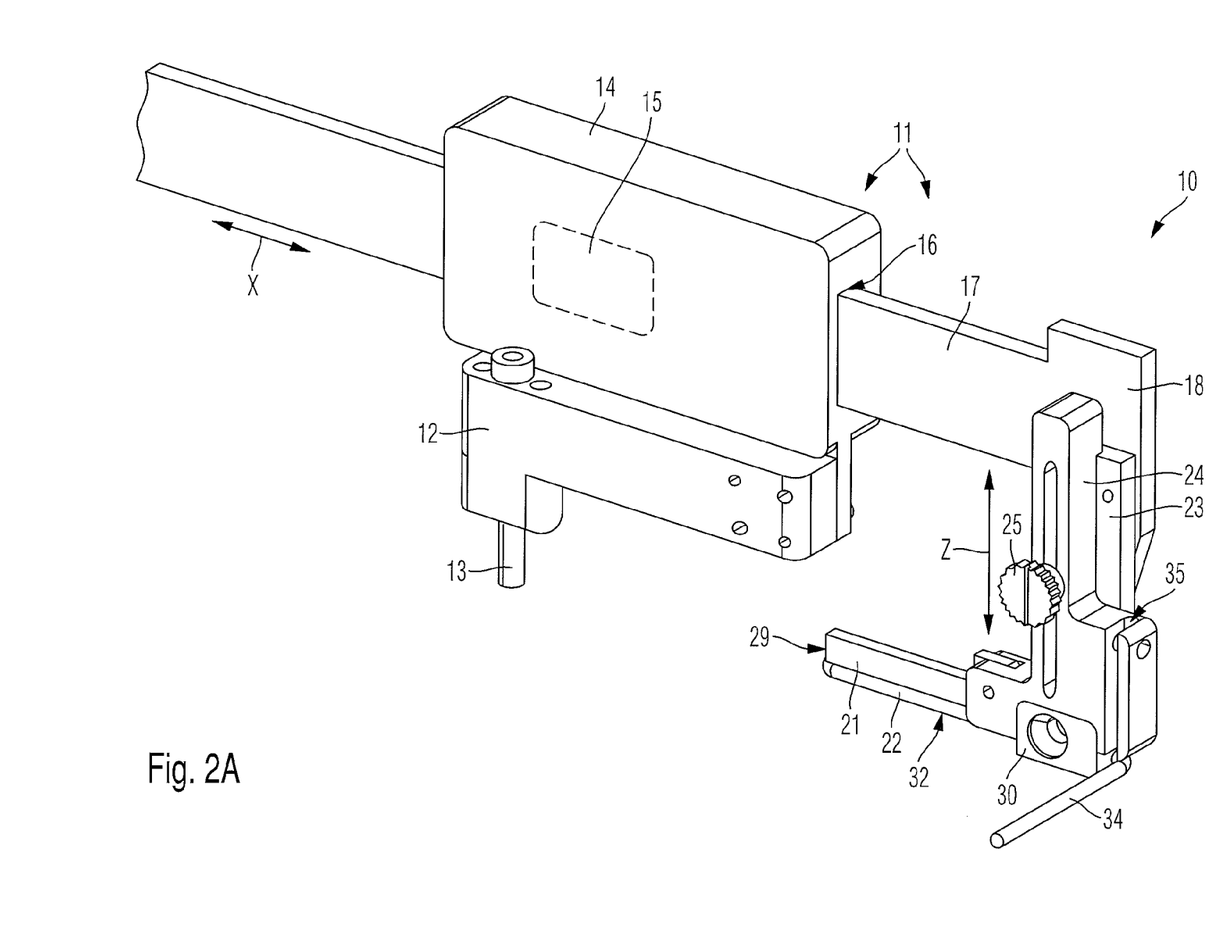
FIGS. 2A-2C are perspective views of the measuring device according to the invention for the purpose of illustrating how the two sensors operate.
Figure 2B:
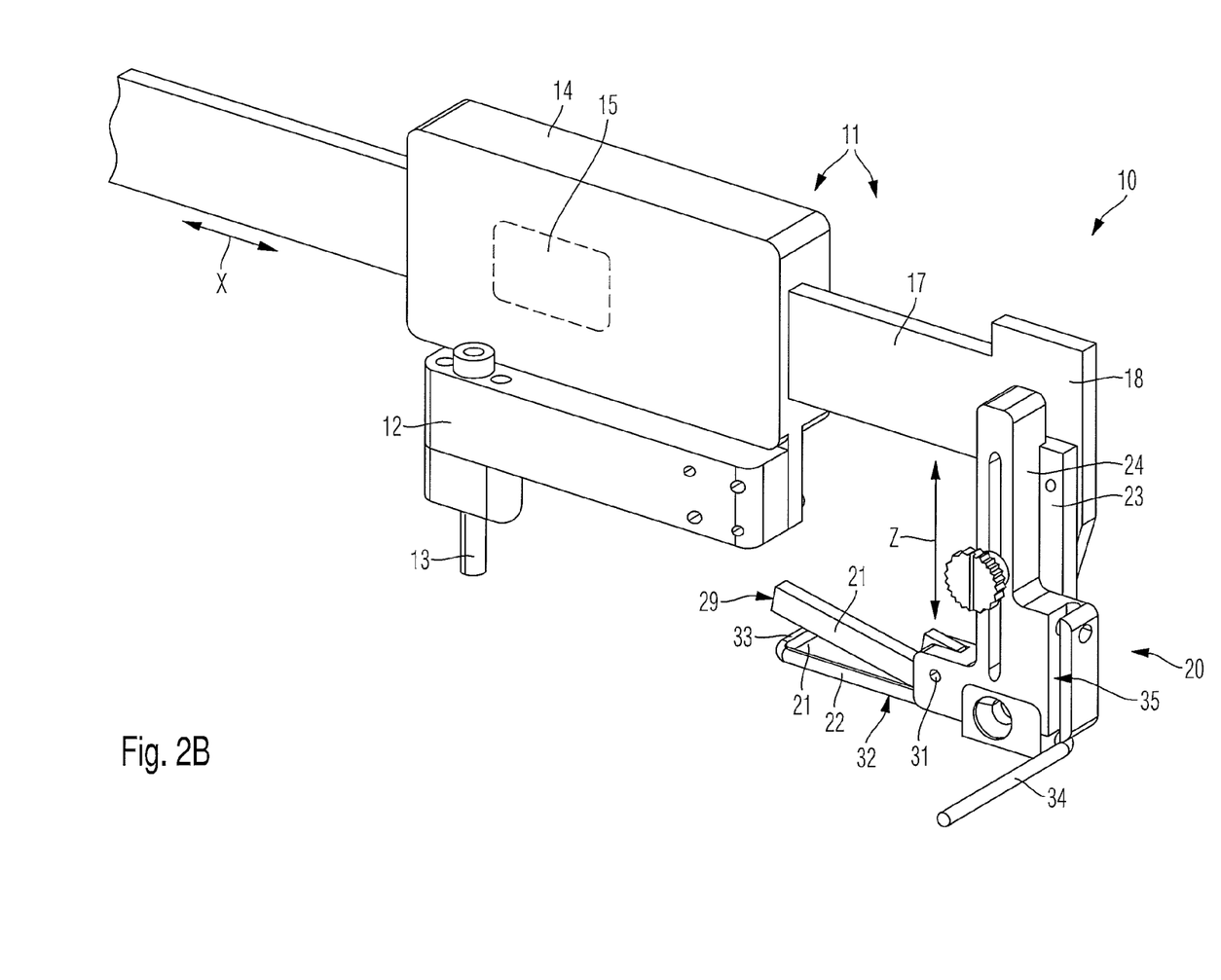
Figure 2C:
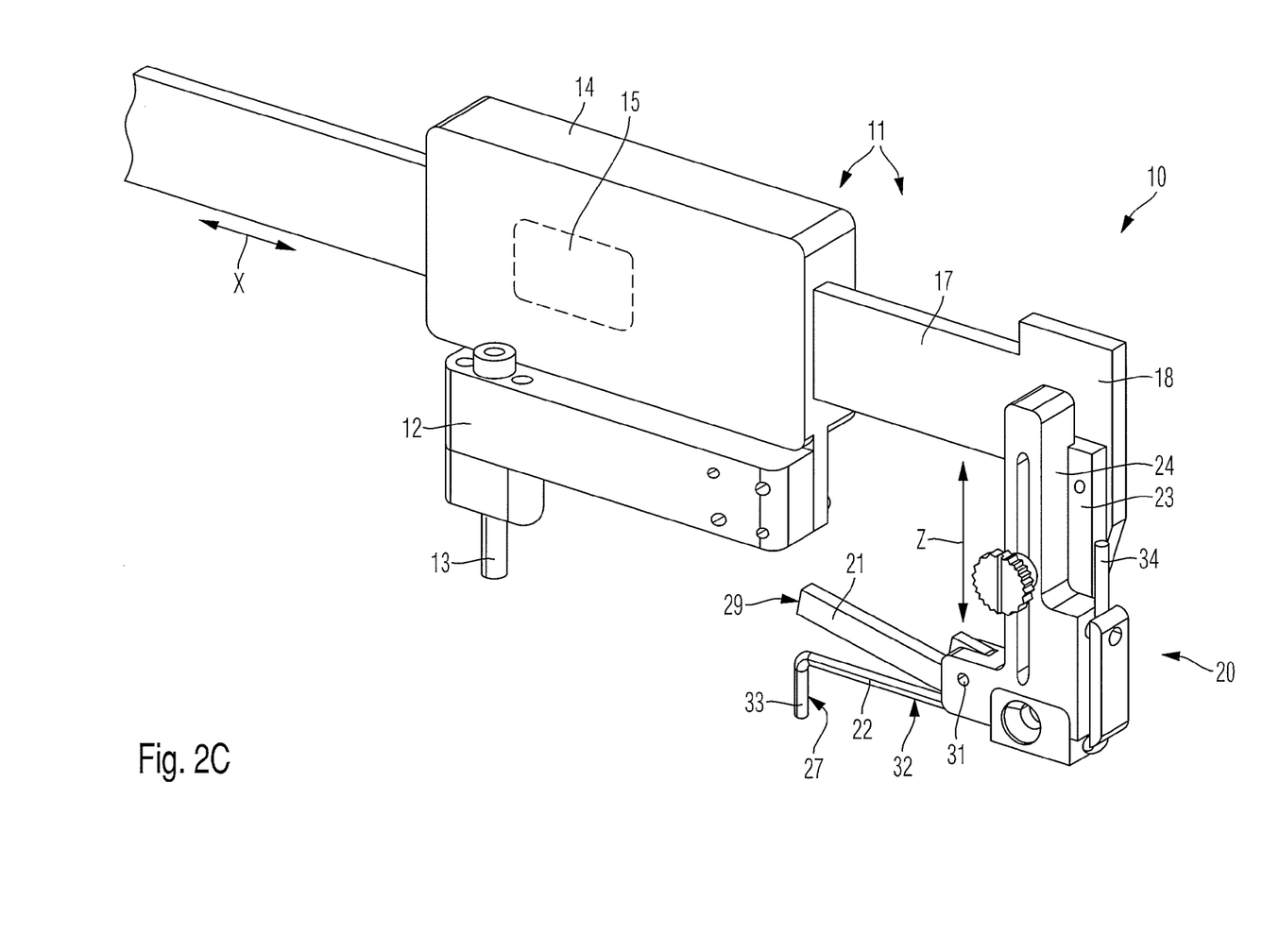

FIG. 2 is a perspective view of a measuring device according to the invention and FIGS. 2A-2C show said measuring device with the two sensors in various positions for the purpose of illustrating how the measuring device operates.

The measuring device according to the invention is denoted in this case with the reference numeral 10. The measuring device 10 comprises a calliper 11 as well as a fixing device 12. The calliper 11 is fixed to the fixing device 12, for example via screws. The fixing device 12 comprises in a fixing region a projecting fixing pin 13, via which the fixing device 12 can be fitted and fixed, for example, to a recess in an aircraft wing provided specifically therefor.

The calliper 11 comprises a rigid calliper housing 14 which is fixed directly to the fixing device 12. A display means 15 for displaying the received measured values is provided in said calliper housing 14. In the present embodiment, it is assumed that the calliper 11 is configured as a digital calliper 11 and thus comprises a digital display means 15 for numerically indicating the measured values. The exact operation of this digital (or even analogue) display means 15 will not be described here in greater detail. The calliper 11 further comprises a through-slit 16 with a constant cross-section in the longitudinal direction X thereof. The cross-section of said slit 16 is approximately rectangular and approximately corresponds to the cross-section of a rail 17 arranged moveably therein, which rail comprises an L-shaped angled branch 18 at one end. Said rail 17, and thus the branch 18 provided at the end of said rail 17, are therefore arranged displaceably in a longitudinal direction 19. By way of a stop device, not shown in FIG. 2, the rail 17 is stopped at the calliper housing 14 in such a way that, in the stopped state, the rail 17 cannot move in the longitudinal direction X.

An adjustment and retaining device 20 is also attached to the branch 18 of the calliper 11. At the lower end of the adjustment and retaining device 20, a first sensor 21 and a second sensor 22 are provided. The first sensor 21 is arranged on the second sensor 22. On the one hand, this adjustment and retaining device 20 has the task of accurately retaining the sensors 21, 22 and thus enabling a precise measuring process to be carried out. Furthermore, the adjustment and retaining device 20 also enables said sensors 21, 22 to be displaced in a vertical direction Z, i.e. in a direction Z perpendicular to the longitudinal direction X. For this purpose, the adjustment and retaining device 20 comprises a stationary rail 23 fixed to the branch 18, in which rail a mobile rail 24 which can be displaced in the vertical direction Z is mounted. The two sensors 21, 22 are fixed to said displaceable rail 24. By way of a stop device 25 configured as a knurled screw 25, the adjustment and retaining device 20 can be stopped in such a way that if the knurled screw 25 is thinly tightened, any displacement in the Z-direction is prevented.

The displaceable rail 24 comprises in its lower region, i.e. in the region of the two sensors 21, 22, a projecting lug 26 which comprises a through-hole formed therein. The first sensor 21 is configured as a substantially rectangular sheet-metal part and also comprises at one end a through-hole, via which the first sensor 21 can be fixed to the lug 26, for example by means of a fixing pin 31. The first sensor 21 is thus rotatably mounted on the lug 26 and can pivot upwards about the axis defined by the fixing pin 31 (see FIGS. 2B, 2C). At its opposite end, the first sensor 21 comprises a planar stop 29.

The second sensor 22 is configured as a double L-shaped measuring wire 22 in the example shown. The lower face of the first sensor 21 rests on the central region 32 of said measuring wire 22. The inner face 27 of the L-shaped angle of the first, front L-shaped angled region 33 is arranged so as to be flush with a plane which is formed by the face of the stop 29. The measuring wire 22 is fixed to the rail 24 via a fixing clamp 30 attached to the displaceable rail 24. The fixing clamp 30 is fixed to the lower end of the adjustment and retaining device 20 and thus to the lower end of the displaceable rail 24. The central region 32 of the measuring wire 22 is thus held by said fixing clamp 30. In addition, this central region 32 of the measuring wire 22 defines an axis of rotation which is oriented substantially in the direction of the longitudinal direction X. The measuring wire 22 is thus rotatably mounted about said axis of rotation defined by the central region of the measuring wire 22 and can thus be pivoted laterally about said axis of rotation (see FIGS. 2A, 2B). The second L-shaped angled region 34 of the measuring wire 22 can be clamped in a groove-shaped recess 35 (see 2A, 2B), provided specifically therefor, of the displaceable rail 24. In the clamped state (see 2, 2C) of the second L-shaped angled region 34 inside the groove-shaped recess 35, the measuring wire 22 is in the pivoted-in state; otherwise it is in the pivoted-out state. In the pivoted-in state, a pressure part (not visible in FIG. 2) loaded with spring force and provided inside the displaceable rail 24 is engaged.

The operation of the measuring device according to the invention will be described below in greater detail with reference to FIGS. 3A to 3D.

Firstly, an aircraft wing 40 is provided (FIG. 3A), which is constructed similarly to the aircraft wing shown in FIG. 1. The aircraft wing 40 likewise comprises a wing body 41 with a spoiler 42 and a landing flap 43 fixed thereto.

Figure 3A:
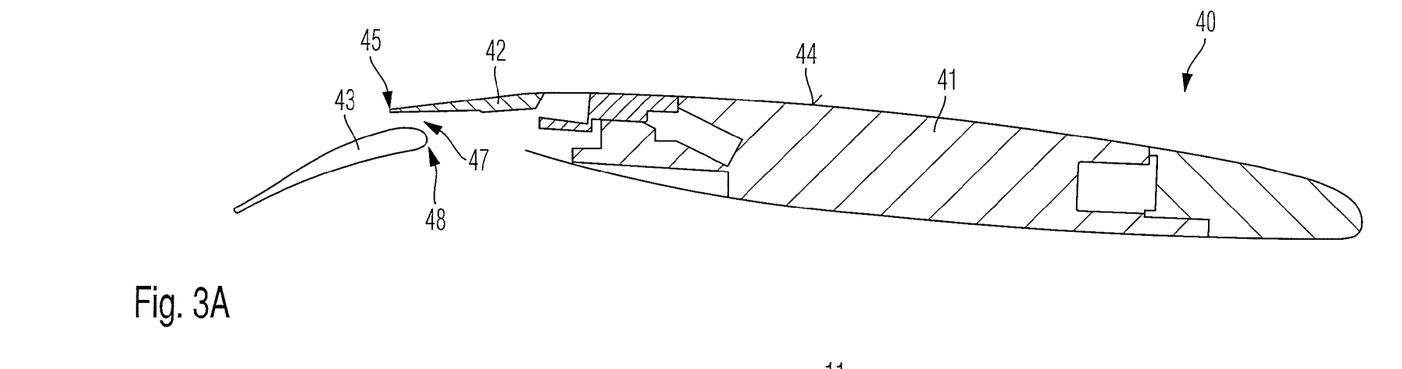
FIGS. 3A-3D are sectional views for the purpose of illustrating a method according to the invention for establishing overlap using a measuring device fixed to an aircraft wing in accordance with FIG. 2.
Figure 3B:
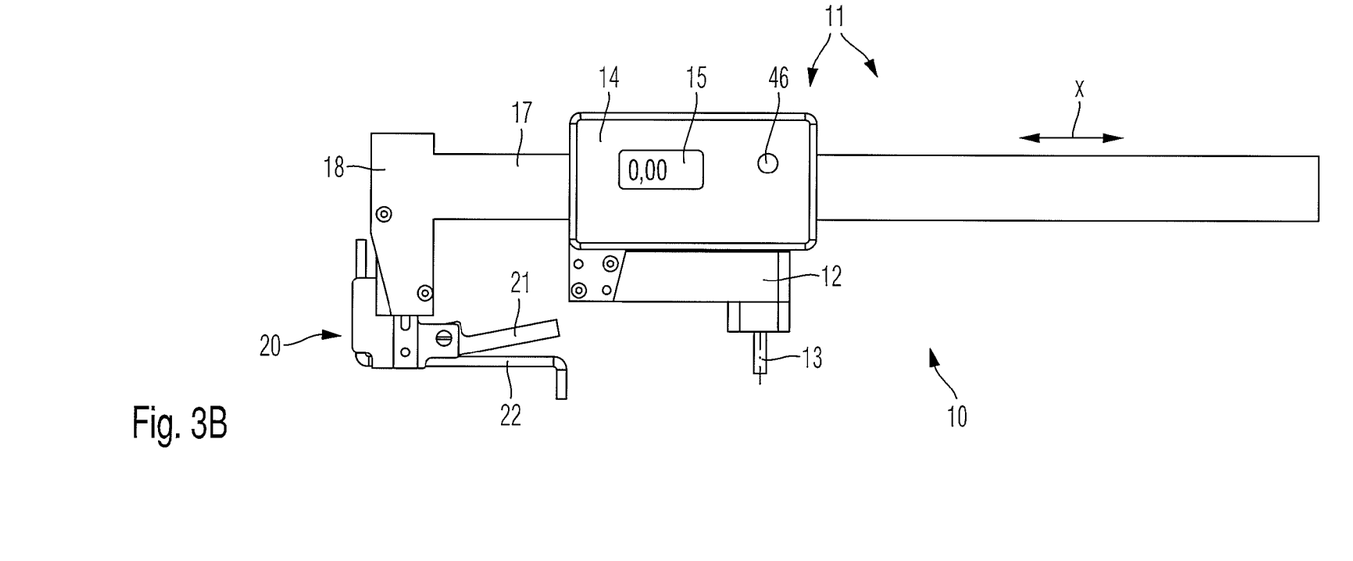
Figure 3C:
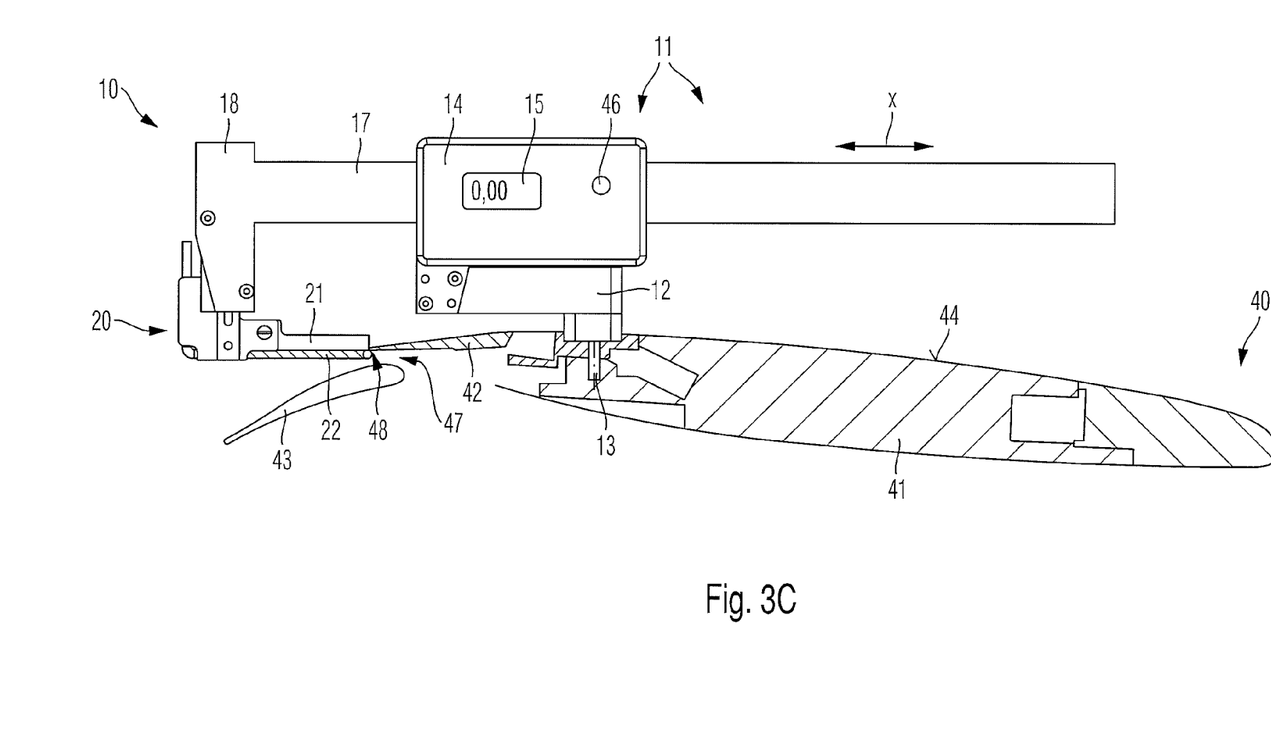

A measuring device 10 according to the invention is also provided (FIG. 3B). The measuring device 10 according to the invention corresponds, for example, to the measuring device 10 described with reference to FIGS. 2 to 2C.

The measuring device 10 is then fixed to the aircraft wing 40 (FIG. 3C), the measuring device 10 being fixed to the upper face 44 of the aircraft wing 40. This fixing process is achieved in that the fixing device 12 is fitted via its fixing pin 13 into a recess which is provided specifically therefor in the upper face of the aircraft wing 10 and, for example, is fixed there via a fixing screw. In a further step, the second sensor 22, i.e. the measuring wire 22, is firstly pivoted laterally so as to enable the rail 17 and the first sensor 21 coupled thereto to be displaced in a largely unhindered manner. In this state, the straight lower face of the first sensor 21, formed by a substantially rectangular part, rests directly on the upper face of the central region 32 of the measuring wire 22 in such a way that the central region 32 of said measuring wire 22 forms a rotational stop which prevents the first sensor 21 from being tilted downwards. By way of an appropriate longitudinal and vertical displacement device, the operation and construction of which was already described above with reference to FIGS. 2 to 2C, makes it possible to position the first sensor 21 at the rear edge 45 of the spoiler 42 in such a way that the stop 29 of the first sensor 21 abuts the rear edge 45 of the spoiler 42. In this state, the display means 15 which is provided in the calliper housing 14 is reset to zero via a resetting device 46 which is also provided in the calliper housing 14.

Subsequently, in a further step (FIG. 3D), the first sensor 21 is first pivoted upwards about its axis of rotation, which is formed by the fixing pin 31, and held there by suitable means or by friction. The laterally pivoted second sensor 22 is now guided via the rail 17, by way of a suitable longitudinal and vertical adjustment of the bar 17 or the adjustment and retaining device 20, between a gap 47 between the spoiler 42 and the landing flap 43. The second sensor 22 is then again pivoted laterally back into the starting position in such a way that the second, rear L-shaped projecting region 34 of the measuring wire 22 is arranged in the groove-shaped recess 35 and engaged there. The first, front region 33 of the measuring wire 22 is then pressed against the front edge 48 of the landing flap 43 and thus positioned there. Lastly, in a final step, the overlap value 40 can be read directly from the display means 15.

Figure 3D:
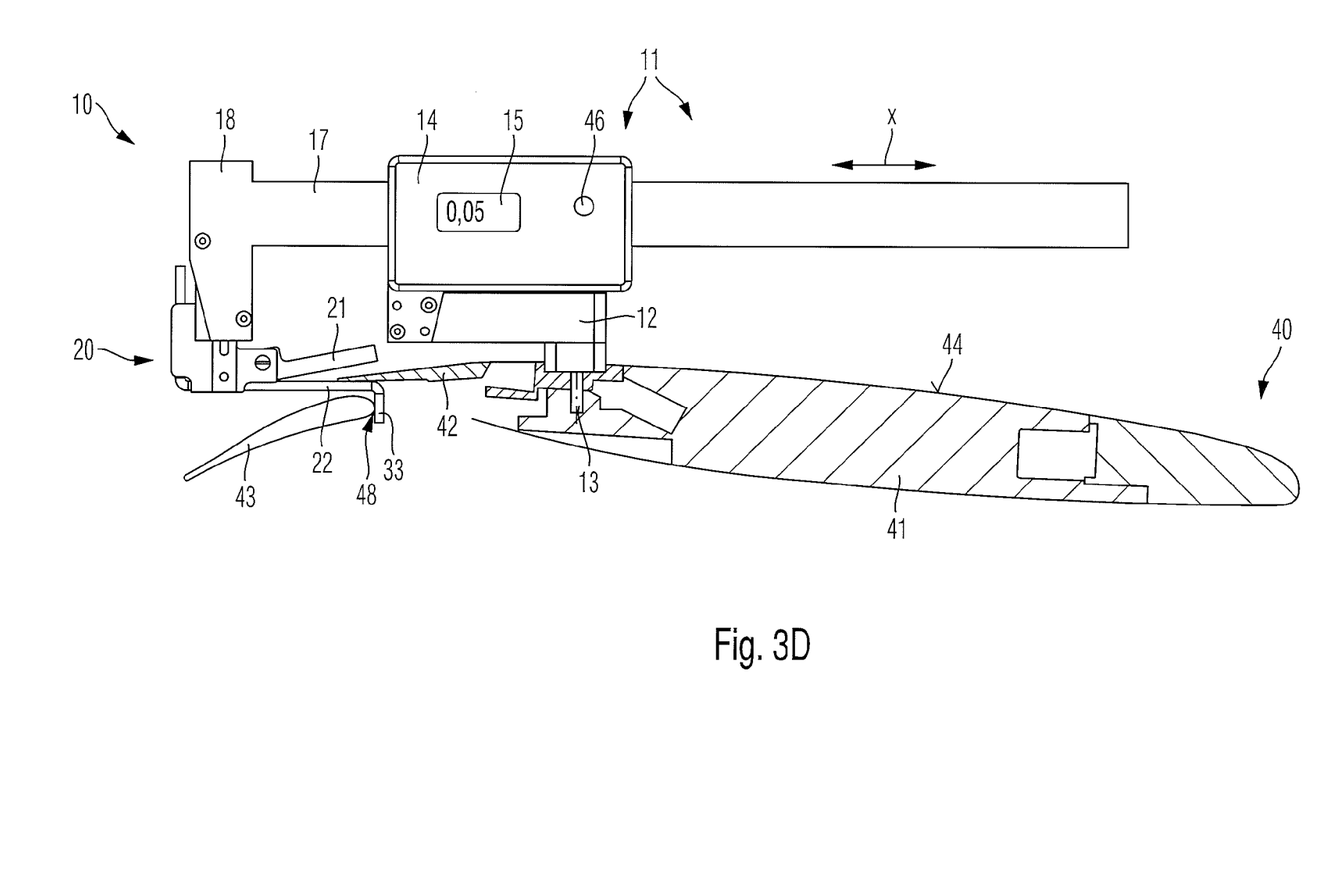

Subsequently, this process may be repeated for other positions of the spoiler 42 and the landing flap 43 and, in particular, for various angles of incidence of these elements 42, 43.

Figure 4:
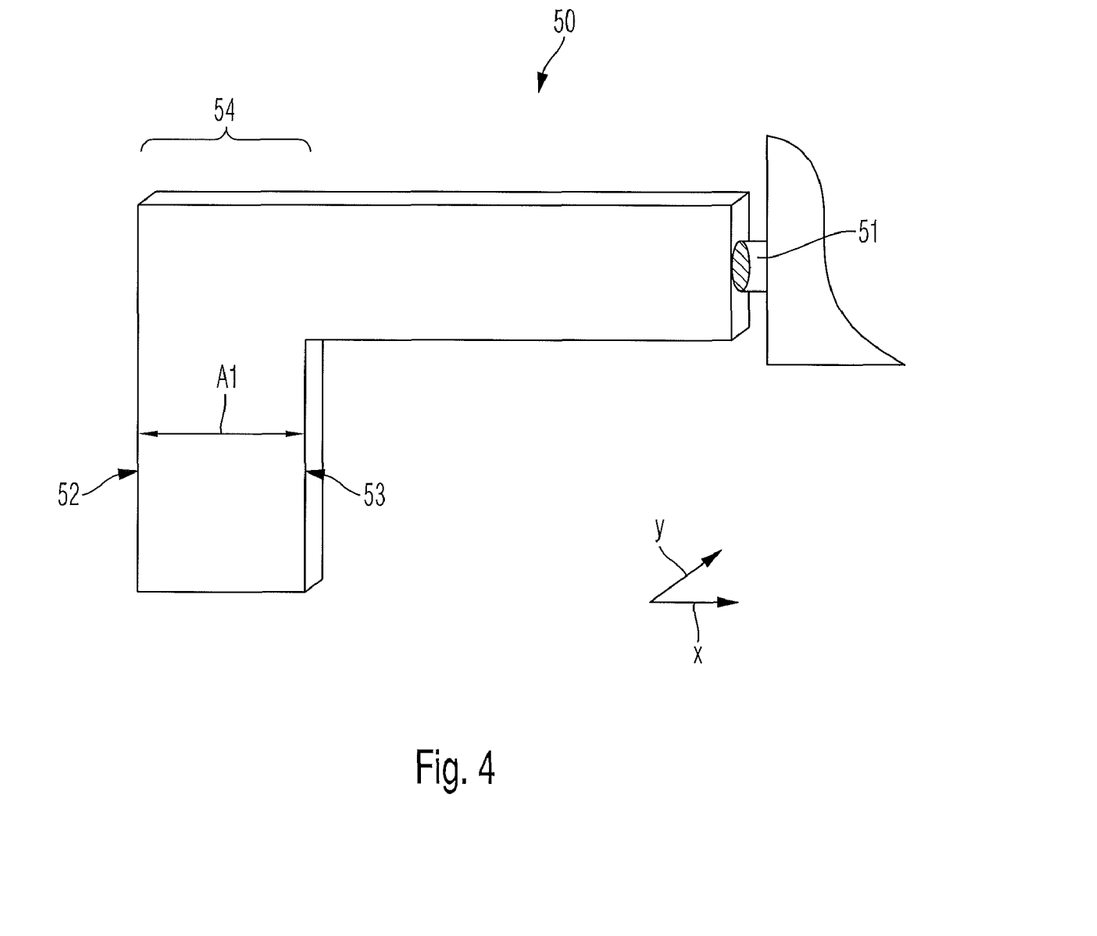
FIG. 4 is a perspective view of a sensor for the purpose of illustrating a second embodiment of a measuring device according to the invention.

FIG. 4 is a perspective view of a sensor for the purpose of illustrating a second embodiment of a measuring device according to the invention.

FIG. 4 shows a single sensor 50 which functions similarly to the two sensors 21, 22 in FIG. 2. This sensor 50 is configured as a sheet-shaped part in the form of an L-shaped angle. In the rear region of the sensor 50, at which the sensor 50 is coupled to the mobile rail 24, a fixing and coupling means 51 is provided. Said fixing and coupling means operates in a rotatable and pivotable manner. In particular, this fixing and coupling means 51 enables the sensor 50 to pivot upwards about a transverse axis provided in the transverse direction Y in the rear region of the sensor so as to enable the upwards pivotable movement of the first sensor 21 according to FIG. 2. Furthermore, the sensor 50 is also rotatably mounted about an axis of rotation extending in the longitudinal direction X so as to thus achieve the lateral rotatable movement of the measuring wire 22 from the example in FIG. 2.

The sensor 50 further comprises a front contact face 52 at the end opposite the fixing and coupling means, i.e. in the region of the L-shaped angle 54, which face corresponds from a functional point of view to the stop 29 from the embodiment of FIG. 2. A rear contact face 53 is provided at the inner face of the L-shaped angle 54, the function of which corresponds to that of the inner face 27 in the embodiment of FIG. 2.

The L-shaped angle 54 has a width A1 in the front region which corresponds to the distance between the contact face 52 and the contact face 53. When establishing overlap, this distance A1 must now be taken into consideration, i.e. the distance A1 must be subtracted from the overlap indicated. When using a digital display means, this can be achieved in a simple manner by not resetting said display means to zero but to the value corresponding to the distance A1. In this case, this overlap can be read precisely from the display means once the overlap has been established. Alternatively, it is of course also possible for the display means to initially be reset to zero and for said distance A1 to be subtracted from the overlap once the overlap has been established by determining the two positions of the front edge of the landing flap and the rear edge of the spoiler.

The present invention is in no way limited to the aforementioned embodiments, which are merely exemplary, but may be modified in any manner without departing from the subject-matter of the present invention.

The invention is therefore not limited purely to measuring overlap in a wind tunnel and for aircraft models. Instead, the overlap measurement may also be carried out outside a wind tunnel and, in particular, for aircraft prototypes or aircraft which have already been manufactured.

In particular, the present invention is not necessarily restricted to the sequence of the various steps given in claim 1, although this sequence is advantageous. In particular, it is also possible for the second sensor to first be pressed against the front edge of the landing flap and then for the display of the calliper to be reset to a predetermined value so as to subsequently press the first sensor against the rear edge of the aircraft wing or against the spoiler fixed thereto. In this case, the mathematical sign on the display must merely be correspondingly reversed to the opposite sign when establishing the overlap.

The invention was also explained with reference to a digital calliper having a digital display. Of course it is also possible for an analogue display to be used, although a digital display is preferred, in particular because it is easier to read.

The construction of the measuring device, in particular with regard to the construction of the two sensors, is merely exemplary. They may, of course, be changed or modified with regard to their structure, materials, size, fixing, directions of movement and the like.

Although the invention was explained with reference to an application in which the two sensors are adjustable in length and height and in which the two sensors can be adjusted relative to both the longitudinal axis and the vertical axis of the aircraft, this is not compulsory. For example, it is also possible with an appropriate configuration of the front region of the measuring wire to forego the possibility of height adjustment, for example if said front region of the sensor is configured so as to be sufficiently long.

Furthermore, the second sensor does not necessarily have to be configured as a measuring wire. Instead, another functionally similar element which is also not necessarily configured in one piece, but is for example pivotable via articulations, is also possible.

LIST OF REFERENCE NUMERALS 1 aircraft wing
2 wing body
3 spoiler
4 landing flaps
10 measuring device
11 calliper
12 fixing device
13 fixing pin
14 calliper housing
15 (digital) display means
16 slit
17 rail
18 branch
20 adjustment and retaining device
21 first sensor
22 second sensor, measuring wire
23 stationary rail
24 displaceable rail
25 knurled screw, stop device
26 lug
27 inner face
29 stop
30 fixing clamp
31 fixing pin
32 central region of the measuring wire
33 front L-shaped angled region of the measuring wire
34 rear L-shaped angled region of the measuring wire
35 groove-shaped recess
40 aircraft wing
41 aircraft body
42 spoiler
43 landing flaps
44 upper face of the aircraft wing
45 rear edge of the spoiler
46 resetting device
47 gap
48 front edge of the landing flap
50 sensor
51 fixing and coupling device
52 front contact face
53 rear contact face
54 L-shaped angle
A front edge of the landing flap A1 width of the L-shaped angle
B rear edge of the spoiler
X longitudinal direction, direction of the longitudinal axis of the aircraft
Y transverse direction, direction of the transverse axis of the aircraft
X vertical direction, direction of the vertical axis of the aircraft

The invention claimed is:

1. A method for measuring overlap between a rear edge of an aircraft wing and a front edge of a landing flap fixed thereto, comprising the following steps:
    providing an aircraft wing, to which a landing flap which is extendable in the longitudinal direction is fixed, and a calliper which can be displaced along its length and comprises at least a first and second sensor fixed thereto;
    fixing the calliper to the aircraft wing;
    positioning and pressing the first sensor against the rear edge of the aircraft wing;
    resetting a display of the calliper to a predetermined value;
    positioning and pressing the second sensor against the front edge of the landing flap;
    reading the overlap value directly from the display of the calliper.

2. The method according to claim 1, wherein when resetting the display of the calliper to a predetermined value the value is reset to zero.

3. The method according to claim 1, wherein the calliper is fixed to an upper face of the aircraft wing, in particular directly above the region of the rails provided for longitudinally displacing the landing flaps.

4. The method according to claim 1, wherein the calliper is fixed to the aircraft wing in such a way that the first and second sensors fixed to the calliper are displaceable in the direction of a longitudinal axis of the aircraft.

5. The method according to claim 1, wherein the calliper is fixed to the aircraft wing in such a way that the first and second sensors fixed to the calliper are displaceable also in the direction of the vertical axis of the aircraft.

6. The method according to claim 1, wherein the rear edge of the aircraft wing is formed by the rear edge of a spoiler, which is fixed to the aircraft wing in the rear region thereof.

7. The method according to claim 1, wherein the second sensor is pivoted out of the measuring region before the first sensor is positioned.

8. The method according to claim 1, wherein the first sensor is pivoted out of the measuring region and the second sensor is pivoted into the measuring region before the second sensor is positioned.

9. The method according to claim 1, wherein the first and/or second sensor has/have reached a measuring position, in which the first or second sensor precisely abuts the rear edge of the aircraft wing or the front edge of the landing flap, when the first and/or second sensor is/are engaged in the engagement device associated therewith.

10. The method according to claim 1, wherein the overlap is established during a wind tunnel test, in which the aircraft, a prototype thereof or a model thereof is arranged in a wind tunnel.

11. A measuring device for measuring overlap between a rear edge of an aircraft wing and a front edge of a landing flap fixed thereto, having a calliper which is displaceable along its length and comprises:
    at least a first sensor fixed to the calliper for measuring a first position of the rear edge of the aircraft wing,
    at least a second sensor fixed to the calliper for measuring a second position of the front edge of the landing flap,
    a display means for displaying the respective measured first and second positions which comprises a reset device for resetting the display means,
having a fixing device for fixing a calliper to the aircraft wing.

12. The measuring device according to claim 11, wherein a height adjustment means is provided which is fixed to the calliper and via which the height of the first and/or second sensor can be adjusted.

13. The measuring device according to claim 11, wherein the first sensor forms a stop, and wherein the second sensor is configured as a double L-shaped angled measuring wire.

14. The measuring device according to claim 11, wherein the first sensor can be pivoted upwards in the direction of the vertical axis, and wherein the second sensor can be pivoted laterally in the direction of the transverse axis.

15. The measuring device according to claim 11, wherein a first and/or second engagement device is associated with the first and/or second sensor, which engagement device indicates a measuring position when in the engaged state, in which the first and/or second sensor precisely abuts the rear edge of the aircraft wing or the front edge of the landing flap.

16. The measuring device according to claim 11, wherein a third and/or fourth engagement device is associated with the first and/or second sensor and indicates, when in the engaged state, that the first sensor and/or the second sensor is/are arranged in a position provided for carrying out the measurement.

17. The measuring device according to claim 11, wherein the display means comprises a digital display.

* * * * *